Nov. 22, 1955 H. C. KNARZER 2,724,598
HANDLE ADJUSTMENT DEVICE FOR LAWN MOWERS AND THE LIKE
Filed July 14, 1953
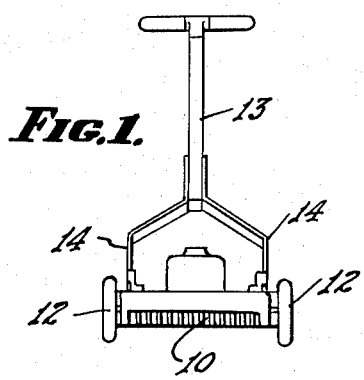
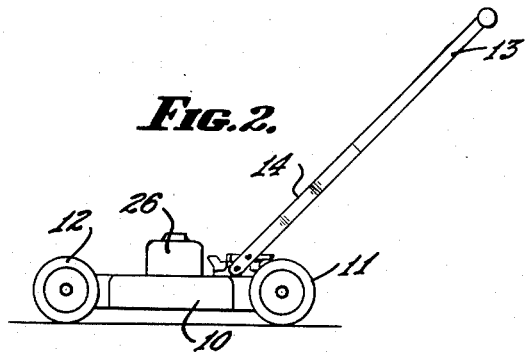
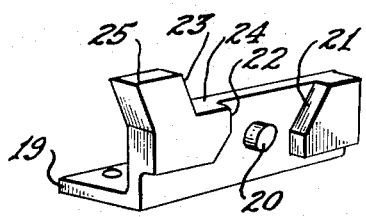
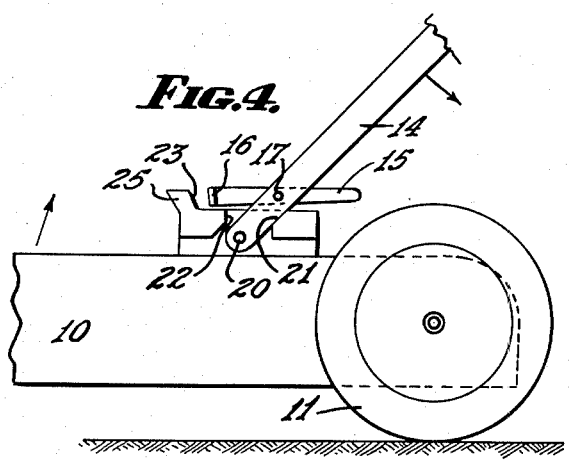
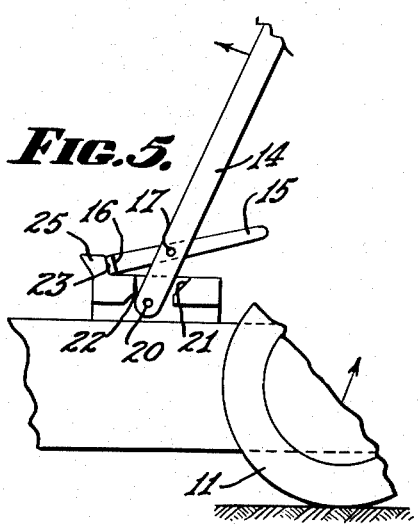
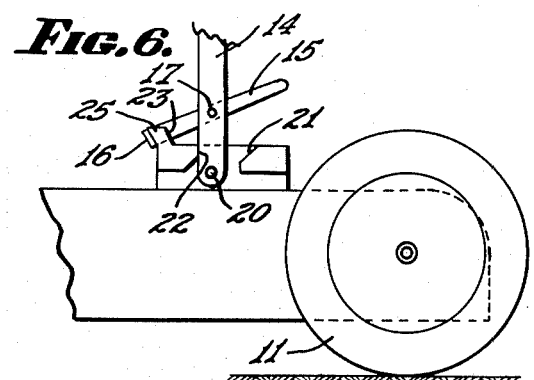
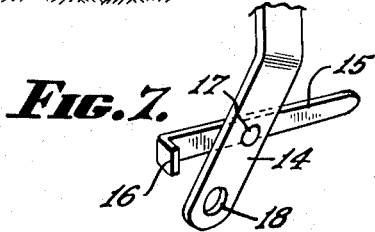
INVENTOR.
HERMAN C. KNARZER,
BY
Allen & Allen
ATTORNEYS.

United States Patent Office

2,724,598
Patented Nov. 22, 1955

2,724,598

HANDLE ADJUSTMENT DEVICE FOR LAWN MOWERS AND THE LIKE

Herman C. Knarzer, Richmond, Ind., assignor to Dille & McGuire Mfg. Co., Richmond, Ind., a corporation of Indiana Application July 14, 1953, Serial No. 367,851

3 Claims. (Cl. 280—47.37)

My invention relates to devices for regulating the handle position of lawn mowers and the like, and is particularly applicable to lawn mowers having blades which revolve in a horizontal plane and to hand and power lawn mowers with the commonly known revolving cutter assembly or reel type with several blades.

It is an object of my invention to provide a very simple and economical structure by which an operator may at one time cause the lawn mower to tilt about the rear wheels or roller thereof and at another time to cause the lawn mower to tilt about the front wheels thereof.

Another object of my invention is to provide a simple device whereby the operator not only can tilt the lawn mower about either pair of wheels or roller as desired but also he can place the handle in a convenient position for storage.

In the practice of my invention I provide each fork of the lawn mower handle with a suitable lug or bearing member to which it is pivoted and with a separate flanged member pivoted thereto. The bearing block has one surface against which the fork of the handle will lie when it is desired to tilt the lawn mower about the rear wheels or roller thereof and another surface against which the pivoted member will lie when it is desired to tilt the lawn mower about the front wheels. In addition there is still another surface on the bearing member which the lawn mower handle fork will abut when it is desired to place the handle in an upright position for storage, the pivoted member and its flange engaging behind still another section of the bearing block in order to maintain the handle in position.

Other objects and advantages of my invention will become apparent to the skilled worker in the art from the following description and with reference to the accompanying drawings in which drawings like numerals are employed to designate like parts throughout the same and in which:

Figure 1 is a front elevation of a lawn mower to which my novel handle adjustment device is applied, Figure 2 is a side elevation of the lawn mower of Figure 1, Figure 3 is a greatly enlarged perspective view of the bearing block comprising a part of my invention, Figure 4 is a fragmentary side elevation showing the position of the parts wherein the lawn mower may be tilted about the rear wheels, or roller Figure 5 is a fragmentary section showing the position of the various parts when the lawn mower handle may be employed to tilt the lawn mower about the front wheels thereof, Figure 6 is a partial side elevation showing the position of the parts when the handle is maintained in substantially upright condition for storage, and Figure 7 is a perspective view of the lower end of a fork section employed with the handle.

In the figures the body of the lawn mower is designated at 10, the rear wheels are indicated at 11 and the front wheels at 12. As shown in Figure 1 the handle 13 is provided with a pair of fork members 14.

As shown in Figure 7 the lower end of each of the fork sections 14 has a member 15 pivoted thereto, the member 15 having a flange 16 projecting at right angles from the forward end thereof. The pivotal connection between the members 14 and 15 is indicated at 17 and it will also be observed that the lower end of the fork member 14 is provided with an opening 18 adapted to engage a suitable stud for pivotal movement with respect to the body of the lawn mower as will be described shortly.

Each of the fork members 14 of the handle 13 is pivotally fastened to the body of the lawn mower 10 by means of a bearing block 19 which includes a stud 20 adapted to fit within the opening 18. The bearing block 19 may be bolted or otherwise securely fastened to the body of the lawn mower. It will be understood that there is a separate bearing block 19 for each of the fork members 14.

Each of the bearing blocks 19 has three important bearing surfaces and these are indicated at 21, 22 and 23 respectively. It will be apparent that the handle 13 through its fork members 14 is pivotally mounted about the studs 20 which are received by the holes 18 and which studs are secured in the bearing block 19.

When it is desired to use the lawn mower in normal manner it will be observed that the position of the handle with respect to the various bearing surfaces of the block 19 is generally indicated in Figure 4. Such position of the parts also enables the operator to tilt the lawn mower about the rear wheels 11 should this prove to be necessary or desirable. As shown in Figure 4 it will be observed that the back edge of the fork member 14 bear against the surfaces 21. It will be apparent that by moving the handle in a clockwise direction about the stud 20, the weight and force transmitted through the fork members 14 to the block 19 via the surfaces 21 will make it possible for the lawn mower 10 to be tilted about its rear wheels. In this position the flanged end 16 of the pivoted member 15 simply rests on the ledge 24 of the block 19.

When the operator desires to tilt the lawn mower 10 about the front wheels it is necessary for him only to push forward on the handle causing it to rotate in a counter-clockwise direction about the stud 20 until the flange 16 bears against the bearing surface 23. Further attempts to move the handle 13 in a counter-clockwise direction will result in the lawn mower 10 being tilted about the forward wheels thereof. This is best seen in Figure 5. The arrows in Figures 4 and 5 indicate the directions in which the force is applied and the tendency of the application of such force to produce a tilting of the lawn mower about either the front or rear wheels as desired.

When it is desired to store the machine such as, for example, when an operator wishes to place it in his garage or when it is desired to ship the lawn mowers, it is often desirable for the handle to assume a substantially upright position in order to save space. With my invention that is easily accomplished as follows. The operator will depress that end of the member 15 which is opposite from the flange 16 until the flange will clear the projection 25 of the block 19, the bearing surface 23 comprising one side of this projection. The operator then pushes the lawn mower handle until the forward edge of the fork sections 14 abut the vertical bearing surface 22. At this time the flange 16 is then caused to engage behind the projection 25 to lock the handle in upright position. To bring the handle into operative position, the operator merely rotates the member 15 in a clockwise direction until the flange 16 disengages from and clears the projection 25 at which time the various parts may then be moved into the position of Figure 4 or 5 as is desired.

It will be observed that the bearing surface 21 is preferably angular and the bearing surface 22 preferably vertical. In addition the relationship between the forward surface of the flange 16 and the bearing surface 23 is such that these members will contact one another throughout substantially the full plane so as to give a solid arrangement and so as to reduce wear. In addition the forward edge of the projection 25 is designed to cooperate with the flange 16 so that again the meeting parts will contact one another throughout a substantial area.

It will be apparent that the lawn mower may carry a motor 26 or the like but the particular construction and means of motivation is not a limitation on the present invention.

In the preferred construction of my invention the member 15 will be so weighted that the flange end 16 thereof will normally tend to rotate in a counter-clockwise direction about the pivot point 17. Thus when the operator depresses that end of the member 15 which is opposite the flange 16 in order that it will clear the projection 25 in moving from the position of Figure 4 to that of Figure 6, it is only necessary to release such pressure with the result that the end 16 will fall of its own weight to a latching position behind the projection 25. The cooperation of the bearing surface 22 and latching engagement just described serves to hold the handle 13 securely in an upright position as described. Similarly, when it is desired to move the handle from the position of Figure 6 to that of either Figures 4 or 5, the lever 15 is rotated in a clockwise direction about the pivot 17 until the flange 16 is disengaged from the projection 25 and until the handle 14 has been rocked in a clockwise direction about the pivot 20 after which the flange 16 will again fall of its own weight to the ledge 24 upon release of the member 15 by the operator.

It will be apparent that modifications may be made in my invention without departing from the scope and spirit thereof and that while I have shown my invention as embodied in specific structure I do not intend to be limited to such structure except insofar as it is specifically set forth in the sub-joined claims. Having thus described my invention, what I claim as new and what I desire to protect by United States Letters Patent is:

1. In a device for adjustably securing a handle to a body to be manipulated thereby, a bearing block secured to said body, said handle being pivotally secured to said block, a member pivoted to said handle, said member having a flange projecting therefrom, and said block having a first bearing surface against which said handle will lie when it is desired to rock said body in one direction and a second bearing surface against which said flange will abut when it is desired to rock said body in a different direction, said handle being pivoted to said block between said bearing surfaces.

2. The device of claim 1 in which said block is provided with a third bearing surface against which said handle will abut when it is desired to maintain the handle substantially upright, said second bearing surface being located on a projection of said block, said flange engaging behind said projection when said handle abuts said third bearing surface whereby to maintain the handle upright, said third bearing surface lying on the same side of the pivoted handle connection as said second bearing surface.

3. A handle adjustment device comprising a block having a first bearing surface sloping at an angle of less than 90°, another bearing surface which is substantially vertical, a stud located between said first and other bearing surfaces and adapted to pivotally support a handle, said first and other bearing surfaces and said stud lying in substantially the same vertical plane, and said block having an upward projection providing yet another bearing surface, said last mentioned bearing surface lying on the same side of said stud as said second mentioned bearing surface.

References Cited in the file of this patent

UNITED STATES PATENTS 2,658,322   Sullivan _____ Nov. 10, 1953